(12) United States Patent
Wang

(10) Patent No.: US 6,969,088 B2
(45) Date of Patent: Nov. 29, 2005

(54) SEAT BELT BUCKLE PRESENTER AND METHOD OF USE THEREFOR

(75) Inventor: Jenne-Tai Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 216 days.

(21) Appl. No.: 10/426,909

(22) Filed: Apr. 29, 2003

(65) Prior Publication Data
US 2004/0217583 A1 Nov. 4, 2004

(51) Int. Cl.$^7$ ............................................. B60R 22/28
(52) U.S. Cl. ..................... 280/802; 280/805
(58) Field of Search ................ 280/802, 804, 280/805, 807, 808, 801.2; 297/481, 473, 297/474

(56) References Cited

U.S. PATENT DOCUMENTS

| 5,123,673 | A | 6/1992 | Tame | 280/801 |
|---|---|---|---|---|
| 5,431,446 | A | 7/1995 | Czarnecki et al. | 280/802 |
| 5,967,573 | A | 10/1999 | Wang | 293/119 |
| 6,193,275 | B1 | 2/2001 | Knox | 280/808 |
| 6,279,954 | B1 | 8/2001 | Townsend et al. | 280/801.1 |
| 6,308,986 | B1 | 10/2001 | Townsend et al. | 280/807 |
| 6,401,565 | B1 | 6/2002 | Wang et al. | 74/502.4 |
| 6,485,058 | B1 | 11/2002 | Kohlndorfer et al. | 280/808 |
| 6,501,374 | B1 | 12/2002 | King et al. | 340/457.1 |
| 6,550,867 | B2 * | 4/2003 | Rogers et al. | 297/468 |
| 6,769,716 | B2 * | 8/2004 | Rouhana et al. | 280/806 |
| 2001/0040369 | A1 | 11/2001 | Townsend et al. | |
| 2002/0043872 | A1 | 4/2002 | Townsend et al. | |

* cited by examiner

Primary Examiner—David R. Dunn
(74) Attorney, Agent, or Firm—Kathryn A. Marra

(57) ABSTRACT

A combination seat belt buckle presenter and seat belt use reminder includes an actuator to cause the extension and retraction of a buckle to improve buckle accessibility. A flexible support member transmits force from the actuator to the buckle. A self-locking device prevents forward or upward movement of the buckle. The self-locking mechanism is preferably configured as an energy-absorbing seat belt load limiter. The seat belt buckle presenter is preferably automated.

20 Claims, 4 Drawing Sheets

US 6,969,088 B2

SEAT BELT BUCKLE PRESENTER AND METHOD OF USE THEREFOR

TECHNICAL FIELD

This invention-relates to automatic seat belt buckle presenters.

BACKGROUND OF THE INVENTION

A prior art vehicle seat belt is typically mounted to a vehicle body near one side of an occupiable surface of a seat. A seat belt buckle is typically mounted near an opposite side of the occupiable surface. The seat belt is adapted to selectively alternate between a stowed position in which the seat belt is located substantially to one side of the seat to facilitate occupant access to the seat, and an engaged position in which the seat belt extends across the occupiable surface to restrain an occupant of the seat between the seat belt and the occupiable surface. The seat belt is retained in the engaged position by the buckle. An occupant of the seat manually moves the prior art seat belt to its engaged position and engages the buckle with a latch plate connected to the seat belt.

The prior art includes seat belt presenters to make seat belts more visible and more easily accessible for movement to the engaged position. The prior art also includes buckle presenters to improve occupant access to the buckle. However, these prior art buckle presenters typically add significant complexity to the seat structure, make the buckle and its connection to the vehicle body massive and highly intrusive to the occupant, or require a significant amount of packaging space within the vehicle. For example, a prior art seat belt presenter employs a rigid, pivotable member to transmit force from an actuator to the buckle. The pivotable member limits the placement of the seat belt buckle presenter because the pivotable member requires dedicated packaging space in which to pivot.

SUMMARY OF THE INVENTION

A seat belt buckle presenter for a vehicle is provided. The seat belt buckle presenter includes a seat belt buckle adapted to engage a latch plate connected to a seat belt for retaining the seat belt in the engaged position. A support member operatively connects the buckle to an actuator. The actuator is adapted to selectively move the buckle between an extended position and a retracted position by selectively extending and retracting the support member. The buckle is higher and more forwardly located in the extended position than in the retracted position so that the buckle is more accessible to the occupant.

The support member is preferably flexible and routed through a guide that directs the movement of the support member. The flexible support member moves axially through the guide, thereby resulting in more compact and flexible transmission of force from the actuator to the buckle compared to the rigid force transmission members of the prior art. Furthermore, the flexible support member provides increased flexibility in packaging the buckle presenter compared to the prior art. For example, the buckle presenter can be packaged under the seating apparatus or inside the seat cushion such that only the buckle is exposed.

The seat belt buckle presenter preferably includes a self-locking mechanism operatively connected to the support member to resist upward or forward movement of the buckle caused by a pulling force applied to the buckle by the seat belt or latch plate during a vehicle impact. In a preferred embodiment, the self-locking mechanism functions as an energy-absorber and seat belt load limiter during a vehicle impact.

The seat belt buckle presenter, if automated, also functions as a seat belt reminder. The seat belt buckle is more prominent in its extended position than in its retracted position. Accordingly, a method for advantageously using the seat belt buckle presenter is also provided. The method includes monitoring at least one vehicle component in the vehicle for the presence or existence of at least one predetermined state, and causing the buckle to move between the extended position and the retracted position in response to the presence or existence of said at least one predetermined state.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
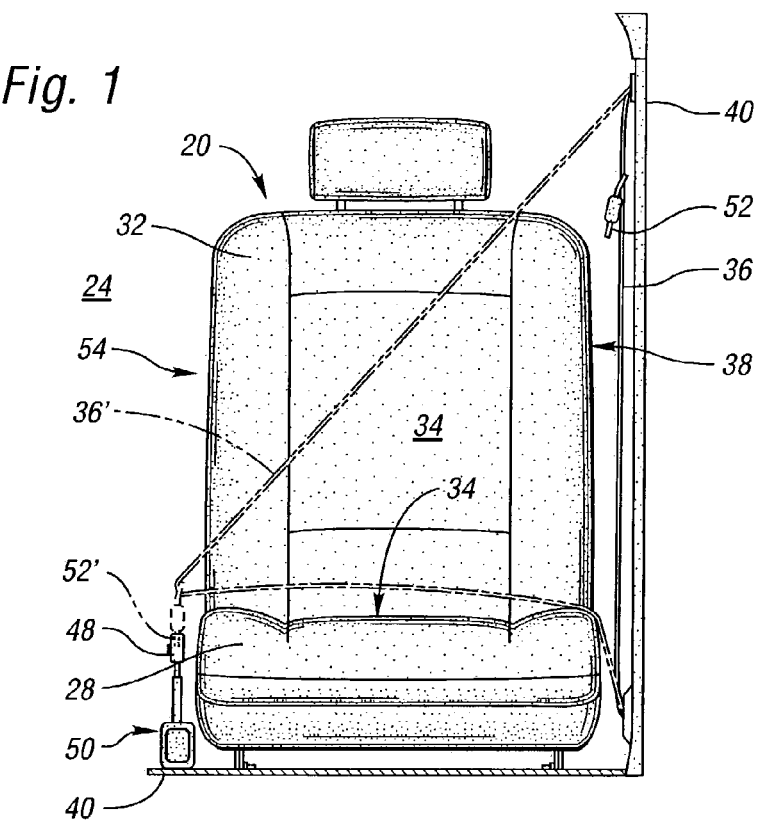
FIG. 1 is a schematic front illustration of a vehicle seating apparatus, seat belt, and seat belt buckle presenter according to the invention.

Referring to FIG. 1, a vehicle seating apparatus 20 is schematically depicted inside a vehicle 24. The seating apparatus 20 has a seat cushion 28 and a seat back 32, and is characterized by an occupiable surface 34. A seat belt 36 is mounted to the body 40 of the vehicle 24 near a first side 38 of the occupiable surface 34. The seat belt 36 is selectively moveable between a stowed position in which the seat belt 36 is located substantially to one side of the seating apparatus 20, and an engaged position, shown in phantom 36', in which the seat belt 36' extends across the occupiable surface 34. A buckle 48 engages a latch plate 52, 52' on the seat belt 36, 36' to retain the seat belt 36' in its engaged position. The buckle 48 is part of a seat belt buckle presenter 50 mounted to the vehicle body 40 near a second side 54 of the occupiable surface 34 opposite the first side 38.

The seat belt 36 and seat belt buckle presenter 50 depicted in FIG. 1 are mounted to the vehicle body 40; however, those skilled in the art will recognize other mounting locations and schemes for a seat belt and a seat belt buckle presenter that may be employed within the scope of the claimed invention. For example, an all-belts-to-seat design, i.e., wherein a seat belt and buckle presenter are connected to, or are an integral part of, a seat assembly, may be employed within the scope of the claimed invention. Those skilled in the art may find that it is preferable to mount the seat belt buckle presenter to a seat frame, particularly in the situation where a seating apparatus is adjustable, that is, movable relative to the vehicle body, so that the buckle moves with the seating apparatus when the latter is adjusted by an occupant.

Figure 2:
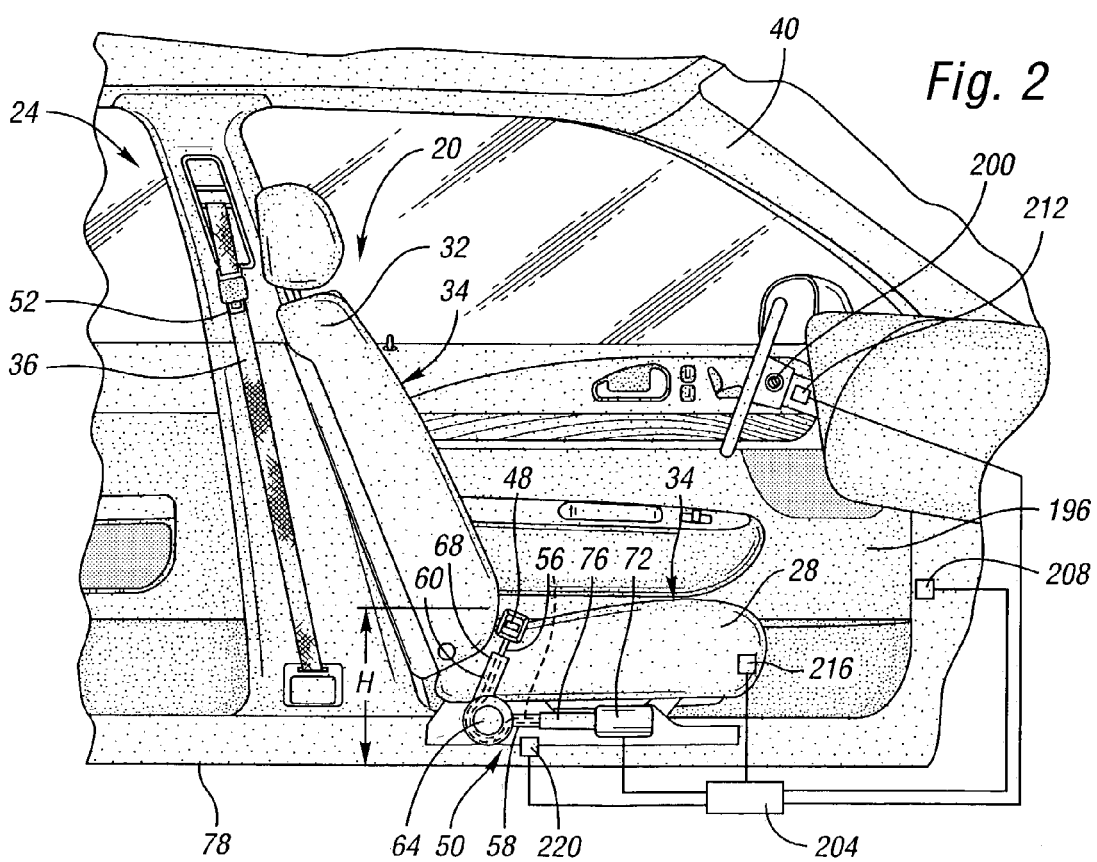
FIG. 2 is a schematic side illustration of a vehicle interior and the seat belt buckle presenter of FIG. 1.
Figure 3:
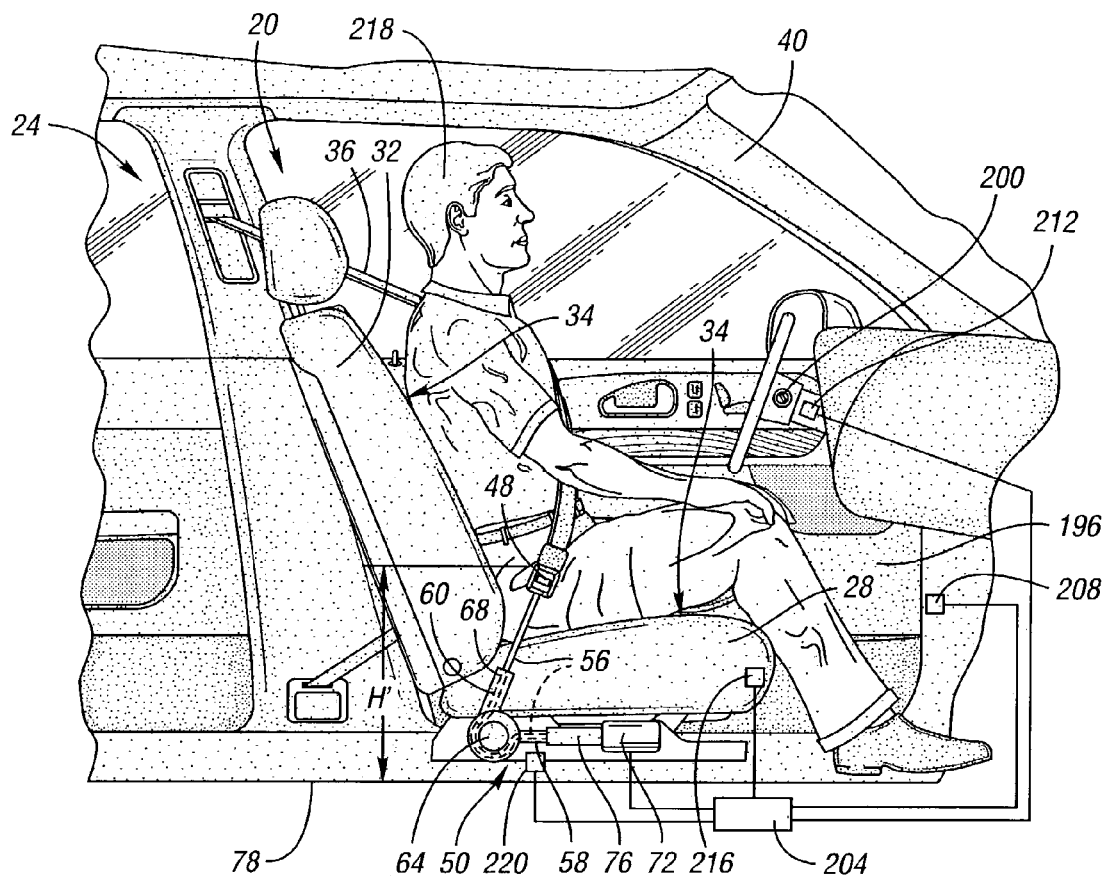
FIG. 3 is a schematic side illustration of the seat belt buckle presenter of FIGS. 1 and 2 in an extended position.

FIG. 2, wherein like reference numbers refer to like components from FIG. 1, is a schematic side view of the seat belt buckle presenter 50. A flexible extendible support member such as a cable 56 is connected to the buckle 48 at one end. The cable 56 is routed through, and slidably engaged with, a flexible sheath 58 and a rigid guide 60. The guide 60 is rigidly mounted with respect to the seat cushion 28. The guide 60 includes a pulley 64 within an angled or curved tube 68. The cable 56 is operatively connected to an electric motor 72 via a self-locking mechanism 76. The motor 72 functions as an actuator to selectively move the buckle 48 between a retracted position as depicted in FIG. 2 and an extended position, as depicted in FIG. 3, by selectively retracting and extending the cable 56. The height H of the buckle 48 relative to the vehicle floor 78 in the retracted position is less than the height H' of the buckle 48 in the extended position, and the buckle 48 is more forwardly located in the extended position than in the retracted position. The self-locking mechanism 76 is sufficiently operatively connected to the cable 56 to resist upward or forward movement of the buckle 48 caused by a pulling force applied to the buckle 48 by the seat belt 36 or latch plate 52 during a vehicle impact.

The cable 56 is slidably engaged with the sheath 58 and the guide 60 so that the cable 56 moves relative to the sheath 58 and the guide 60 during cable extension and retraction. The sheath 58 and guide 60 are sufficiently configured and positioned to support the cable 56 and redirect the movement of the cable 56 as the cable 56 passes through and contacts the sheath 58 and guide 60 during cable extension or retraction. The embodiment of the seat belt buckle presenter depicted is characterized by the absence of a rigid, pivotable support member operatively connected to the buckle 48. It may be preferable to omit the flexible sheath from the seat belt buckle presenter. For example, the rigid guide may be lengthened so that it abuts the self-locking mechanism, or the self-locking mechanism may be positioned in closer proximity to the rigid guide.

In FIGS. 2 and 3, the self-locking mechanism is positioned with respect to the pulley such that the pulley's axis of rotation is aligned with the centerline of the self-locking mechanism. However, by positioning the self-locking mechanism 76 with respect to the pulley 64 such that the centerline of the self-locking mechanism 76 is tangential to the pulley 64, the cable 56 follows a less circuitous path.

Figure 4:
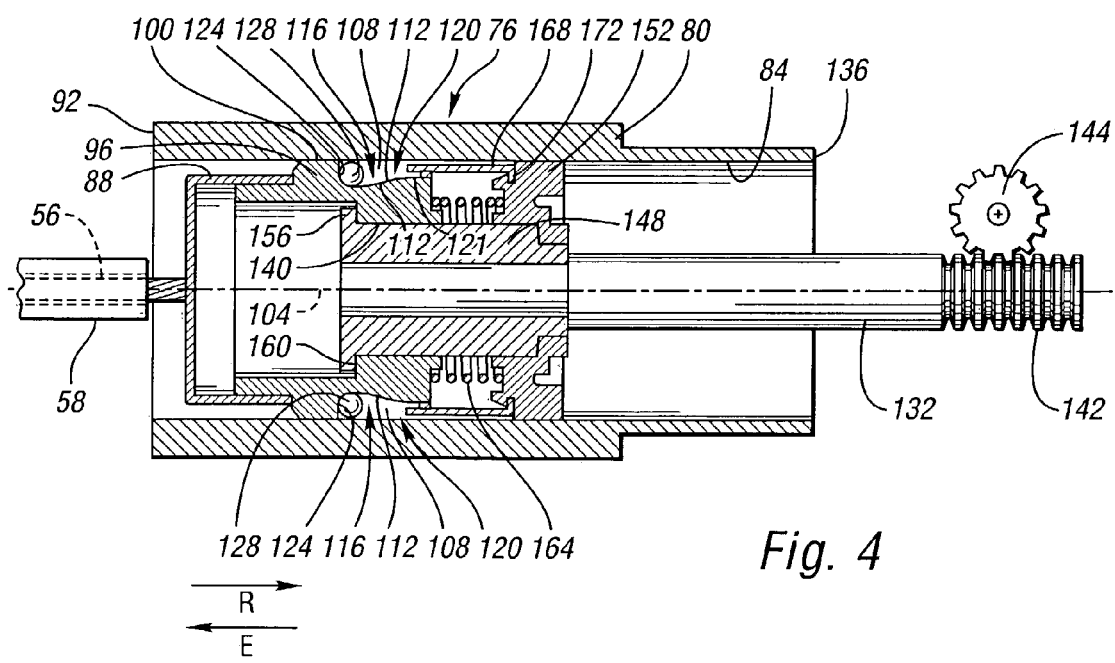
FIG. 4 is a schematic cross-sectional illustration of a self-locking mechanism for use with the seat belt buckle presenter of FIGS. 1–3.

Referring to FIG. 4, wherein like reference numbers refer to like components from FIGS. 1–3, a preferred embodiment of the self-locking mechanism 76 is schematically depicted. The self-locking mechanism 76 is similar to a self-locking mechanism described in U.S. Pat. No. 6,401,565, issued Jun. 11, 2002 to Wang, et al, which is hereby incorporated by reference in its entirety. However, the self-locking mechanism 76 is configured to lock when a member is urged away from a stationary part of the self-locking mechanism 76, whereas the self-locking mechanism described in the '565 patent locks when a member is urged in a particular manner toward a stationary part of the self-locking mechanism.

The self-locking mechanism 76 includes a stationary outer tube 80 having an inside cylindrical wall 84 and an inner member 88 telescoped into the outer tube 80 through an end 92 of the latter. The cable 56 is mounted to the inner member 88. An end fitting 96 rigidly attached to the inner member 88 constitutes an end thereof in the outer tube 80 and includes an outside cylindrical wall 100 bearing against and cooperating with the inside cylindrical wall 84 of the outer tube 80 in supporting the inner member 88 on the outer tube 80 for translation in an extension direction E in which the cable 56 is extended and in a opposite retraction direction R in which the cable 56 is retracted, each direction parallel to a longitudinal centerline 104 of the outer tube 80.

A plurality of grooves 108, or open spaces, is formed in the outside cylindrical wall 100 of the end fitting 96. Each groove 108 is partially defined by a ramp surface 112 that faces the inside cylindrical wall 84 on the outer tube 80. The distance between each ramp surface 112 and the inside cylindrical wall 84 is greater at a first, or deep, end 116 of the groove 108 than at a second, or shallow, end 120 of the groove 108. The ramp surface 112 merges with a flat surface 121 at the shallow end 120. End walls 124 are formed in the end fitting 96 at the first end 116 of each of the ramp surfaces 112. A spherical rolling element 128 is located in each of the grooves 108.

During translation of the inner member 88 in the retraction direction R, the rolling elements 128 are cupped in the grooves 108 against the end walls 124 thereof, where they slide along the inside cylindrical wall 84 of the outer tube 80 without obstructing translation of the inner member 88. Conversely, at the onset of translation of the inner member 88 in the extension direction E, the rolling elements 128 roll up the ramp surfaces 112 and quickly become wedged between the ramp surfaces 112 and the inside cylindrical wall 84 of the outer tube 80 thereby effectively resisting movement of the inner member 88 and cable 56.

When a force on the inner member 88 in the extension direction E is attributable to a high load on the inner member 88 transmitted via the cable 56, the self-locking mechanism 76 functions as an energy absorber and seat belt load limiter. That is, the rolling elements 128 traverse the ramp surfaces 112 and become interference fitted between the flat surfaces 121 and the inside cylindrical wall 84 of the outer tube 80. During subsequent linear translation of the inner member 88 in the outer tube 80, the rolling elements 128 plastically deform the outer tube 80 by rolling or plowing tracks therein thereby to absorb energy by converting into work a fraction of the kinetic energy transmitted by the cable 56. The hardness of the rolling elements 128 does not exceed the hardness of the end fitting 96; thus the end fitting 96 is not plastically deformed by the rolling elements 128. FIG. 4 is a schematic depiction of the self-locking mechanism 76, and is not drawn to scale. Those skilled in the art will recognize that the length of the outer tube 80, as well as the distance between the inner member 88 and the first end of the tube 92 when the latch is in the retracted position, will preferably be larger than depicted in FIG. 4 to provide the inner member with a longer length of travel during an energy-absorption stroke.

The resistive load-limiting force of the self-locking mechanism 76 is a function of the penetration depth of the rolling elements 128 into the outer tube 80, which is determined in part by the distance between the flat surface 121 and the inside cylindrical wall 84; the number of rolling elements 128; the radius of each rolling element 128; the thickness of the outer tube 80; and the material properties of the outer tube 80.

The self-locking mechanism 76 further includes an actuator rod 132 telescoped into a second end 136 of the outer tube 80 and into a bore 140 in the end fitting 96 on the inner member 88. The actuator rod 132 has a rack gear 142 thereon which meshes with a pinion gear 144. The pinion gear 144 is connected to the electric motor (not shown) so that the motor, the pinion gear 144, and the rack gear 142 constitute a drive means operable to translate the actuator rod 132 back and forth in the extension and retraction directions E, R.

A tubular hub 148 is rigidly attached to the actuator rod 132 and supports the actuator rod 132 in the bore 140 in the end fitting 96 for translation relative to the inner member 88 in the direction of the longitudinal centerline 104 of the outer tube 80. A ring 152 is rigidly attached to the hub 148 at the end thereof facing the rack gear 142 on the actuator rod 132 and cooperates with the inside cylindrical wall 84 of the outer tube in supporting the actuator rod 132 on the outer tube 80 for back and forth translation in the extension and retraction directions E, R of the inner member 88. An annular flange 156 on the end of the hub 148 opposite the ring 152 faces an annular shoulder 160 on the end fitting 96 around the bore 140. A compression spring 164 seats against the ring 152 and against the end fitting 96 and biases the end fitting 96 and the actuator rod 132 in opposite directions until the annular flange 156 seats against the annular shoulder 160.

A retainer 168 of the self-locking mechanism 76 surrounds the compression spring 164 and overlaps the gap between the end fitting 96 and the ring 152. The retainer 168 includes a hooked end 172 seated in a corresponding annular groove in the ring 152 whereby the retainer 168 is rigidly attached to the ring 152 and, therefore, to the actuator rod 132.

The ring 152 and the spring 164 constitute a first clutch which effects translation of the actuator rod 132 and the inner member 88 in the extension direction E in response to corresponding rotation of the pinion gear 144. That is, when the pinion gear 144 rotates clockwise, the thrust applied to the actuator rod 132 is transferred to the end fitting 96 through the ring 152 and the spring 164 and urges the inner member 88 in the extension direction E. At the same time, the retainer 168 is urged by the ring 152 in the extension direction E so that the retainer 168 extends sufficiently into the grooves 108 to contact the rolling elements 128 and retain the rolling elements 128 in the first end 116 of the grooves 108 and against the end walls 124 so that the rolling elements 128 do not roll up the ramp surfaces 112. The rolling elements 128 thus slide along the inside cylindrical wall 84 of the outer tube 80 while cupped against the end wall 124 without interfering with translation of the inner member 88.

Conversely, the annular flange 156 on the hub 148 and the annular shoulder 160 on the end fitting 96 constitute a second clutch which effects unitary translation of the actuator rod 132 and the inner member 88 in the retraction direction R in response to corresponding rotation of the pinion gear 144. That is, when the pinion gear 144 rotates counterclockwise, the thrust applied to the actuator rod 132 is transferred directly to the end fitting 96 through the flange 156 and the annular shoulder 160 and urges the inner member 88 in the retraction direction R.

Figure 5:
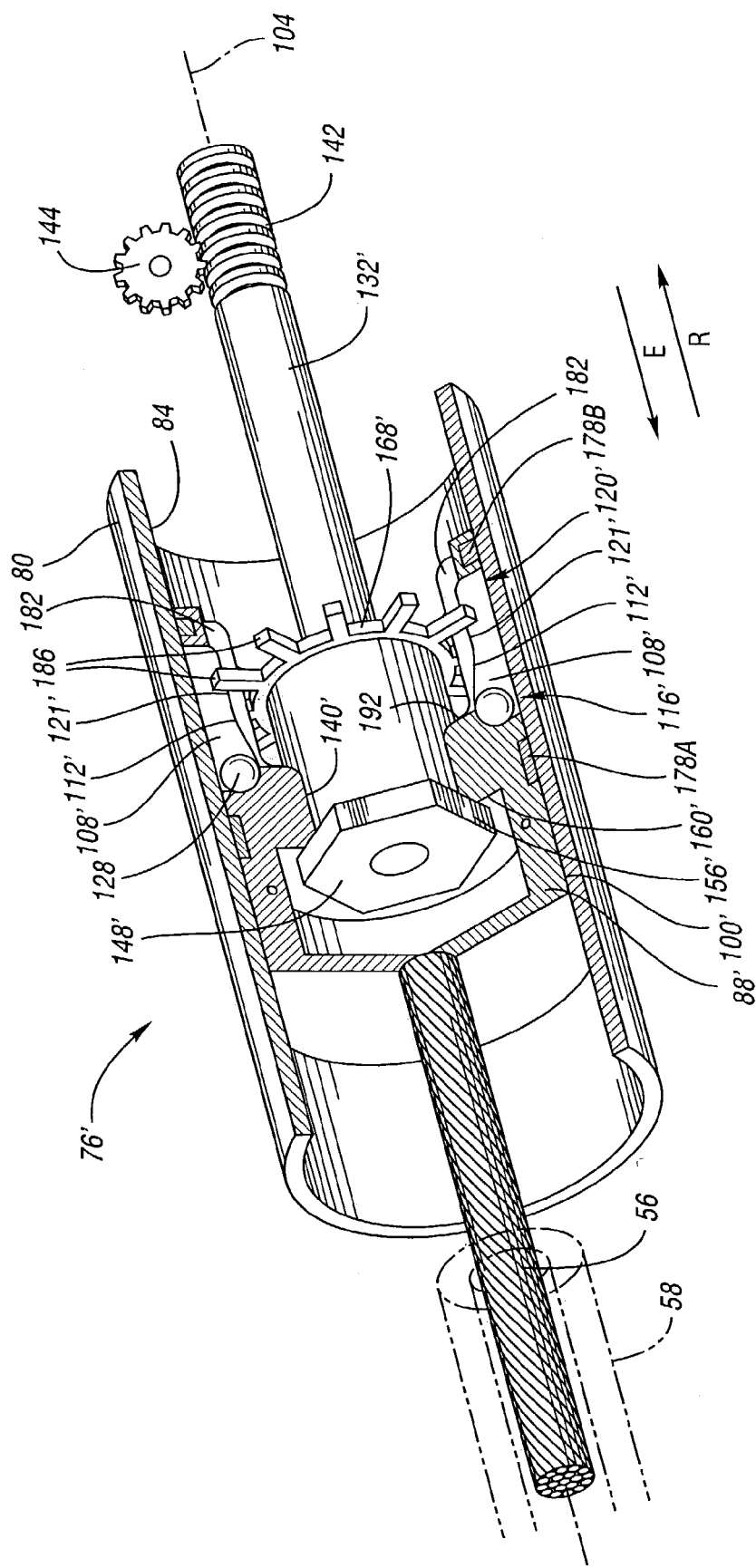
FIG. 5 is a schematic partially cut-away perspective illustration of another self-locking mechanism for use with the seat belt buckle presenter of FIGS. 1–3.

Referring to FIG. 5, wherein like reference numbers refer to like components from FIGS. 1–4, an alternative self-locking mechanism 76' for use with the seat belt buckle presenter is schematically depicted. The alternative self-locking mechanism 76' is similar to a self-locking mechanism described in U.S. Pat. No. 5,967,573, issued Oct. 19, 1999 to Wang, which is hereby incorporated by reference in its entirety. However, the self-locking mechanism 76' is configured to lock when a member is urged away from a stationary part of the self-locking mechanism 76', whereas the self-locking mechanism described in the '573 patent locks when a member is urged in a particular manner toward a stationary part of the self-locking mechanism.

The self locking mechanism 76' includes a cylindrical outer tube 80 having a longitudinal centerline 104. The outer tube 80 may have any convenient cross sectional shape other than circular. An inner member 88' is supported on the outer tube 80 for back and forth linear translation in the direction of the longitudinal centerline 104 of the outer tube 80 with an outer cylindrical wall 100' of the inner member 88' facing an inner cylindrical wall 84 of the outer tube 80. The cross sectional shape of the inner member 88' matches the cross sectional shape of the outer tube 80.

A plurality of grooves 108' in the outer cylindrical wall 100' of the inner member 88' are parallel to the longitudinal centerline 104 of the outer tube 80 and face the inner cylindrical wall 84 thereof. The grooves 108' are disposed between a pair of bearing rings 178A, 178B on the inner member 88' which cooperate in maintaining concentricity between the inner member 88' and the outer tube 80 during relative linear translation therebetween. Each groove 108' is partially defined by a ramp surface 112' that faces the inside cylindrical wall 84 on the outer tube 80. The distance between each ramp surface 112' and the inside cylindrical wall 84 is greater at a first, or deep, end 116' of the groove 108' than at a second, or shallow, end 120' of the groove 108'. The ramp surface 112' merges with a flat surface 121' at the shallow end 120'. The inner member 88' is interrupted by a plurality of radial slots 182 which intersect respective ones of the grooves 108'.

Respective ones of a plurality of rolling elements 128, e.g. steel spheres, are disposed in respective ones of the grooves 108' over the radial slots 182 in the inner member 88'. The diameters of the rolling elements 128 are substantially the same as the depths of the grooves 108' at the deep ends 116' thereof to minimize contact between the rolling elements 128 and the inner cylindrical wall 84 of the outer tube 80 when the rolling elements 128 are lodged at the deep ends 116' of the grooves 108'.

A tubular hub 148' is supported by a bore 140' of the inner member 88' for back and forth linear translation relative to the inner member 88' in the direction of the longitudinal centerline 104 of the outer tube 80. A hex flange 156' on the hub 148' bears against an annular first shoulder 160' on the inner member 88' around the bore 140' to limit relative linear translation therebetween in one direction. A retainer 168' having a plurality of radial fingers 186 is connected to the hub 148' at the opposite end thereof from the flange 156'. The retainer 168' and fingers 186 bear against an annular second shoulder 192 on the inner member 88' to limit relative linear translation between the hub 148' and the inner member 88' in the other direction. The radial fingers 186 slide back and forth in respective ones of the radial slots 182 in the inner member 88' and radially overlap the grooves 108' between the rolling elements 128 therein and the shallow ends 120' thereof.

The actuator rod 132' is rigidly attached to the hub 148'. When the pinion gear 144 rotates clockwise the pinion gear 144 induces linear translation of the actuator rod 132' and the hub 148' in the extension direction E. The radial fingers 186 on the hub 148' engage the annular second shoulder 192 on the inner member 88'. The thrust of the pinion gear 144 on the actuator rod 132' is transferred through the hub 148' to the inner member 88' to induce linear translation of the inner member 88' and the cable 56 relative to the outer tube 80.

Concurrently, the radial fingers 186 on the hub 148' engage respective ones of the rolling elements 128 and confine the rolling elements 128 to the deep ends 116' of the grooves 108' to prevent the rolling elements 128 from wedging against the cylindrical inner wall 84 of the outer tube 80 and interfering with linear translation of the inner member 88' and cable 56.

When the pinion gear 144 rotates counterclockwise, the pinion gear 144 induces linear translation in the retraction direction R of the actuator rod 132' and the hub 148'. The hub 148' translates relative to the inner member 88' until the flange 156' on the hub 148' engages the annular first shoulder 160' on the inner member 88'. The direction of relative movement between the inner member 88' and the outer tube 80 causes the rolling elements 128 to remain lodged in the deep ends 116' of the grooves 108' so that linear translation of the inner member 88' relative to the outer tube 80 is unopposed by rolling elements 128.

A force exerted on the inner member 88' from the cable 56 inducing linear translation of the inner member 88' in the extension direction E will cause the inner member 88' to move independently of the hub 148'. Relative linear translation between the inner member 88' and the outer tube 80 causes the rolling elements 128 to roll in the grooves 108' toward the shallow ends 120' thereof until the rolling elements 128 become wedged against the inner cylindrical wall 84 of the outer tube 80. Thereafter, the rolling elements traverse the ramp surfaces 112' and become interference fitted between the flat surfaces 121' and the inside cylindrical wall 84 of the outer tube 80. During subsequent linear translation of the inner member 88' in the outer tube 80, the rolling elements 128 plastically deform the outer tube 80 by rolling or plowing tracks therein thereby to absorb energy by converting into work a fraction of the kinetic energy transmitted by the cable 56.

The resistance afforded by the rolling elements 128 wedged against the inner cylindrical wall 84, i.e., the resistive load-limiting force of the self-locking mechanism 76', is a function of the penetration depth of the rolling elements 128 into the outer tube 80, which is determined in part by the distance between the flat surface 121' and the inside cylindrical wall 84; the number of rolling elements 128; the radius of each rolling element 128; the thickness of the outer tube 80; and the material properties of the outer tube 80. FIG. 5 is a schematic depiction of the self-locking mechanism 76', and is not drawn to scale. Those skilled in the art will recognize that the length of the outer tube 80, as well as the distance between the inner member 88' and the end of the tube through which the cable 56 extends, will preferably be larger than depicted in FIG. 5 to provide the inner member with a longer length of travel during an energy-absorption stroke.

Referring again to FIGS. 2 and 3, the vehicle 24 includes at least one vehicle door 196 moveable between an open position and a closed position. The vehicle 24 also includes an ignition switch 200 switchable between an on position and an off position. The seat belt presenter 50 preferably includes a controller 204 operatively connected to a plurality of sensors that are adapted to monitor at least one vehicle component and communicate a state of the at least one vehicle component to the controller 204. The sensors preferably include a door position sensor 208 sufficiently configured and positioned with respect to the door 196 to monitor the position of the door 196 and communicate the position of the door 196 to the controller 204. An ignition switch sensor 212 is sufficiently configured and positioned with respect to the ignition switch 200 to monitor the position of the ignition switch 200 and communicate the position of the ignition switch 200 to the controller 204. A sensor 216 is sufficiently configured and positioned with respect to the seat cushion 28 to monitor and detect whether the seating apparatus 20 is occupied by an occupant 218 and communicate whether the seating apparatus 20 is occupied to the controller 204. Sensors 220 monitor the position of the buckle 48 and whether the buckle 48 is engaged or disengaged with the latch plate 52.

The controller 204 is programmed and configured to cause the motor 72 to extend or retract the cable 56 and thereby move the buckle 48 between the extended and retracted positions in response to at least one of the sensors communicating the existence of at least one predetermined state. Within the scope of the claimed invention, communication by a sensor may include both the presence and the absence of an electrical or other signal when the absence of a signal is indicative of a state of a vehicle component. Thus, for example, the door position sensor 208 may be a switch that is open when the door 196 is in the closed position and closed when the door 196 is in the open position. Thus, the sensor 208 only transmits an electrical signal when the door is open. However, the absence of a signal from the sensor 208 indicates to the controller 204 that the door is in the closed position.

Figure 6:
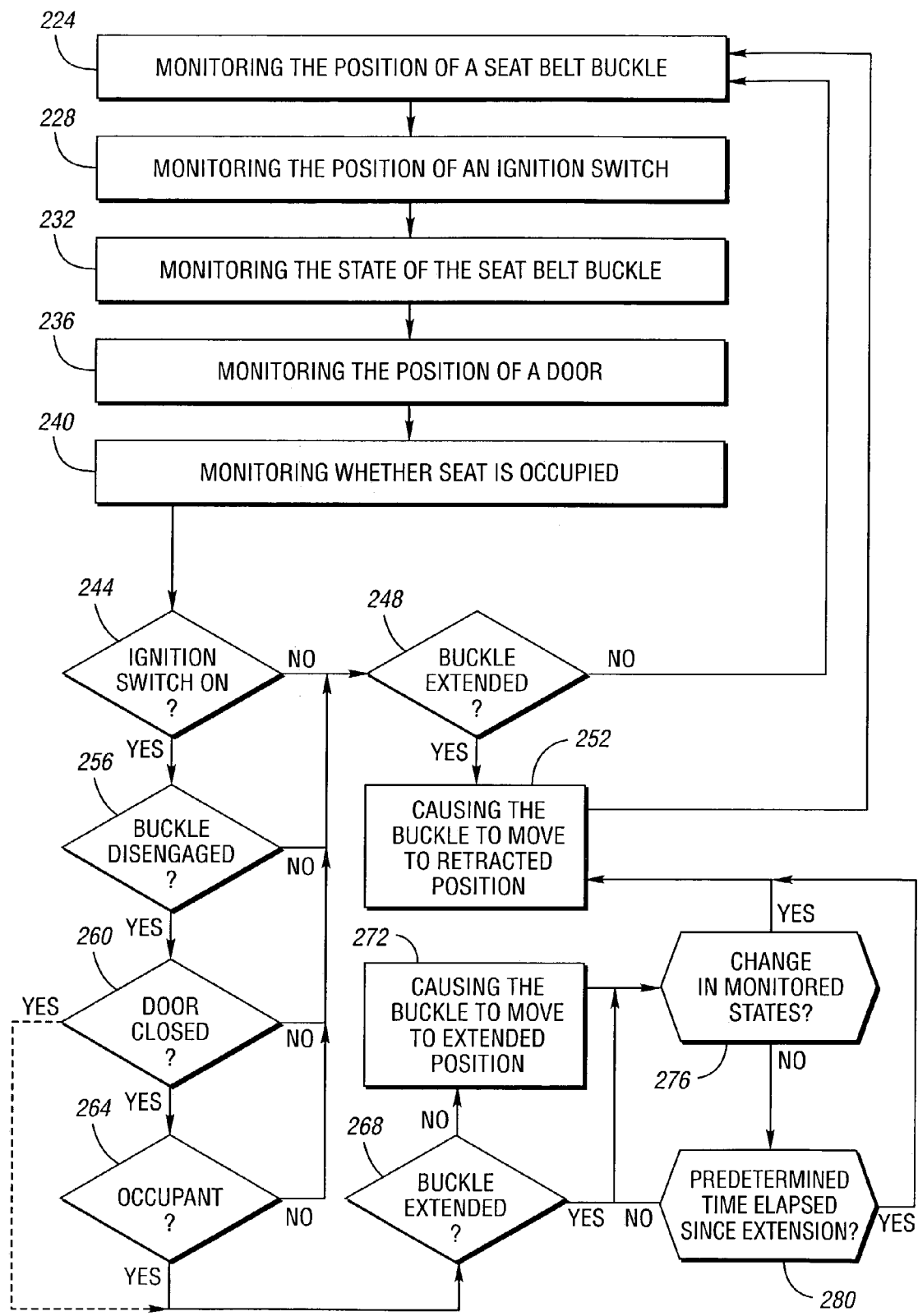
FIG. 6 is a schematic flow diagram of a method of using the seat belt buckle presenter of FIGS. 1–3.

Referring to FIG. 6, a method for automating the seat belt presenter is schematically depicted. The method represents an exemplary control logic for the seat belt presenter. The method includes monitoring various vehicle components for the presence or existence of at least one predetermined state. The method also includes causing the buckle to move between the extended position and the retracted position in response to the presence or existence of the at least one predetermined state. More specifically, the method preferably includes the sensors monitoring the position of the seat belt buckle 224, monitoring the position of the ignition switch 228, monitoring the state of the seat belt buckle 232, i.e., whether the seat belt buckle is engaged or disengaged from the latch plate, and monitoring the position of the vehicle door 236. The method may also include monitoring whether the vehicle seat is occupied 240. The sensors communicate the states of the vehicle components to the controller.

The controller is programmed to follow an algorithm wherein the controller inquires if the ignition switch has been in the on position continuously for a predetermined duration of time, for example, ten seconds 244. If the answer is no, then the controller inquires if the buckle is in the extended position 248. If the answer to inquiry 248 is yes, that is, if the buckle is in the extended position, then the controller engages in the step of causing the buckle to move from the extended position to the retracted position 252.

The predetermined duration of time results in a time delay that will reduce the frequency of buckle presenter actuation for occupants who always engage the seat belt. It may be advantageous for the predetermined duration of time to be zero so that the controller causes the buckle to extend every time certain predetermined states exist.

If the controller detects via the ignition switch sensor that the ignition switch has been in the on position continuously for the predetermined amount of time, that is, if the answer to inquiry, or decision, 244 is yes, then the controller inquires if the buckle has been disengaged from the latch plate continuously for the predetermined amount of time 256. If the answer is no, then the controller moves to inquiry 248. If the answer is yes, then the controller inquires if the door has been in the closed position continuously for the predetermined amount of time 260. If the answer is no, then the controller moves to inquiry 248. If the answer is yes, then the controller inquires if an occupant has been occupying the seat for the predetermined amount of time 264. If the answer is yes, then the controller inquires if the buckle is in the extended position 268.

If the answer is no, then the controller engages in the step of causing the buckle to move from the retracted position to the extended position 272. After step 272, or if the answer to inquiry 268 is yes, the controller inquires if there has been a change in the monitored states 276, i.e., if the door is no longer in the closed position, the seat is no longer occupied, the buckle is no longer disengaged, or the ignition switch is no longer in the on position. If the answer is yes, then the seat belt buckle need not be in the extended position, and the controller engages in the step of causing the buckle to move to the retracted position 252. If the answer to inquiry 276 is no, then the controller inquires whether a predetermined amount of time, for example, five minutes, has elapsed since the extension of the buckle 280. If the answer is yes, then the controller engages in the step of causing the buckle to move to the retracted position 272 because the lapse of time indicates that the occupant will not employ the seat belt. If the answer to inquiry 280 is no, then the controller moves to inquiry 276.

It may be advantageous in certain circumstances, where the seat is a driver's seat, for example, for the controller to move from inquiry 260 to inquiry 268, and omit inquiry 264. The seat belt buckle presenter can be used in place of an audible and/or visual seat belt use reminder, or it can be used in conjunction with an audible and/or visual seat belt use reminder.

As set forth in the claims, various features shown and described in accordance with the different embodiments of the invention illustrated may be combined.

While the best modes for carrying out the invention have been described in detail, those familiar with the art to which this invention relates will recognize various alternative designs and embodiments for practicing the scope of the invention within the scope of the appended claims.

What is claimed is:

1. A seat belt buckle presenter for a vehicle, the buckle presenter comprising:
a seat belt buckle; a support member operatively connected to the seat belt buckle; an actuator operatively connected to the support member to selectively move the buckle between an extended position and a retracted position by selectively extending and retracting the support member, the buckle being higher and more forwardly located in the extended position than the refracted position; and a load-limiter operatively connected to the support member.

2. A seat belt buckle presenter for a vehicle, the buckle presenter comprising:
a seat belt buckle; a support member operatively connected to the seat belt buckle; and an actuator operatively connected to the support member to selectively move the buckle between an extended position and a retracted position by selectively extending and retracting the support member, the buckle being higher and more forwardly located in the extended position than the retracted position; wherein the support member is flexible.

3. The seat belt buckle presenter of claim 2, further comprising a guide, the support member being slidably engaged with the guide so that the support member moves relative to the guide during support member extension and retraction, the guide being sufficiently configured and positioned to support or redirect the movement of a portion of the support member as the portion of the support member contacts the guide during support member extension or retraction.

4. The seat belt buckle presenter of claim 3, further comprising a load-limiter operatively connected to the support member.

5. The seat belt buckle presenter of claim 4, wherein the load-limiter includes
a stationary outer tube;
an inner member operatively connected to the support member, telescoped into the outer tube, and supported on the outer tube for translation in an extension direction in which the support member and buckle are extended, and in a retraction direction in which the support member and buckle are retracted;
a ramp on the inner member facing an inside cylindrical wall on the outer tube, the ramp and the inside cylindrical wall defining an open space therebetween, the distance between the ramp and the inside cylindrical wall being greater at a first end of the open space than at a second end of the open space; and
a rolling element between the ramp and the inside cylindrical wall on the outer tube;
wherein the rolling element is cupped against the first end of the open space during translation of the inner member in the retraction direction without interfering with translation of the inner member in the refraction direction, and wherein the rolling element rolls up the ramp into wedging engagement between the ramp and the inside cylindrical wall on the outer tube during translation of the inner tube in the extension direction from a pulling force exerted on the inner member via the buckle or support member, thereby resisting extension of the buckle and support member.

6. The seat belt buckle presenter of claim 5, wherein the load-limiter further includes
an actuating member telescoped into the outer tube and operatively connected to the actuator such that the actuator selectively causes back and forth linear motion of the actuating member; and
a retainer operatively connected to the actuating member and extending into the open space between the sphere and the second end of the ramp;
wherein the actuating member is sufficiently connected to the inner member to cause lateral movement of the inner member in the extension direction and retraction direction, the retainer being adapted to retain the rolling element in the first end of the open space to permit movement of the inner member in the extension direction caused by movement of the actuating member.

7. The seat belt buckle presenter of claim 2, further comprising a controller and at least one sensor operatively connected to the controller and adapted to monitor at least one vehicle component and communicate a state of said at least one vehicle component to the controller;
wherein the controller is operatively connected to the actuator; and
wherein the controller is programmed and configured to cause the actuator to extend or retract the support member in response to said at least one sensor communicating the existence of at least one predetermined state of said at least one vehicle component.

8. The seat belt buckle presenter of claim 7, wherein said at least one sensor is configured to monitor a seating apparatus and communicate the presence or absence of an occupant in the seating apparatus to the controller, and wherein said at least one predetermined state includes the presence or absence of an occupant in the seating apparatus.

9. The seat belt buckle presenter of claim 7, wherein said at least one sensor is configured to monitor the position of a door and communicate the position of the door to the controller; and wherein said at least one predetermined state includes the door being in an open position or the door being in a closed position.

10. The seat belt buckle presenter of claim 7, wherein said at least one sensor is sufficiently configured and positioned to monitor the state of the seat belt buckle and communicate to the controller whether the seat belt buckle is engaged with a latch plate; and wherein said at least one predetermined state includes the buckle being engaged or disengaged with the latch plate on the seat belt.

11. The seat belt buckle presenter of claim 7, wherein said at least one sensor is configured to monitor the position of an ignition switch and communicate the position of the ignition switch to the controller; and wherein said at least one predetermined state includes the ignition switch being in an on position or the ignition switch being in an off position.

12. A method of providing improved seat belt buckle accessibility, the method comprising:
  monitoring at least one vehicle component in a vehicle for the presence or existence of at least one predetermined state, the vehicle having
    a seat belt having a latch plate operatively connected thereto,
    a seat belt buckle presenter including a seat belt buckle adapted to engage the latch plate, a flexible, extendible support member operatively connected to the seat belt buckle, and an actuator operatively connected to the support member to selectively move the buckle between an extended position and a retracted position by selectively extending and retracting the support member, the buckle being higher and more forwardly located in the extended position than in the retracted position; and
  causing the buckle to move between the extended position and the retracted position in response to the presence or existence of said at least one predetermined state.

13. The method of claim 12, wherein said causing the buckle to move is performed after said at least one predetermined state has existed continuously for a predetermined amount of time.

14. The method of claim 12, wherein said at least one vehicle component includes
  an ignition switch movable between an on position and an off position, and the buckle; and
  wherein said monitoring said at least one vehicle component includes monitoring the position of the ignition switch and monitoring whether the buckle is engaged or disengaged with the latch plate.

15. The method of claim 14, wherein said at least one predetermined state includes the ignition switch being in the on position and the buckle being disengaged from the latch plate; and wherein said causing the buckle to move comprises causing the buckle to move from the retracted position to the extended position.

16. The method of claim 15, wherein said at least one vehicle component further includes a door movable between an open and a closed position; wherein said monitoring said at least one vehicle component further includes monitoring the position of the door; and wherein said at least one predetermined state further includes the door being in the closed position.

17. The method of claim 16, wherein the vehicle includes a seating apparatus, and said at least one vehicle component includes the seating apparatus; wherein said monitoring said at least one vehicle component includes monitoring whether the seating apparatus is occupied by an occupant; and wherein said at least one predetermined state includes the seating apparatus being occupied by an occupant.

18. The method of claim 16, wherein the method further comprises causing the buckle to move from the extended position to the retracted position after a second predetermined amount of time has elapsed from said causing the buckle to move from the retracted position to the extended position.

19. The method of claim 12, wherein said at least one predetermined state includes the buckle being engaged with the latch plate, and wherein said causing the buckle to move comprises causing the buckle to move from the extended position to the retracted position.

20. A seal belt buckle presenter for a vehicle having a seat belt and a seating apparatus characterized by an occupiable surface, the seat belt being adapted to selectively alternate between a stowed position in which the seat belt is located substantially to one side of the occupiable surface to facilitate occupant access to the seating apparatus, and an engaged position in which the seat belt extends across the occupiable surface, the seat belt buckle presenter comprising;
  a seat belt buckle operatively engageable with a latch plate connected to the seat belt for retaining the seat belt in its engaged position;
  a flexible support member operatively connected to the seat belt buckle;
  an actuator operatively connected to the support member to selectively move the buckle between an extended position and a retracted position by selectively extending and retracting the support member, the buckle being higher in the extended position than the retracted position;
  a guide, the support member being slidably engaged with the guide so that the support member moves relative to the guide during support member extension and retraction, the guide being sufficiently configured and positioned to support or redirect the movement of a portion of the support member as the portion of the support member contacts the guide during support member extension or retraction; and
  a load-limiter operatively connected to the support member.

* * * * *